(12) United States Patent
Coyne et al.

(10) Patent No.: US 8,903,559 B2
(45) Date of Patent: *Dec. 2, 2014

(54) ENERGY GRID DEVICE COMMISSIONING

(71) Applicant: International Business Machines Corporation, Armonk, NY (US)

(72) Inventors: Michael L. Coyne, Mount Colah (AU); Vrunda R. Negandhi, Sangli (IN); Pradeep Pappu, Sarrornagar (IN); Manish C. Patel, Ahmedabad (IN); Abhay K. Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,200

(22) Filed: Mar. 25, 2014

(65) Prior Publication Data

US 2014/0207295 A1  Jul. 24, 2014

Related U.S. Application Data

(63) Continuation of application No. 13/078,089, filed on Apr. 1, 2011, now Pat. No. 8,718,829.

(51) Int. Cl.
*G05D 11/00* (2006.01)
*G05B 15/02* (2006.01)

(52) U.S. Cl.
CPC ............................ *G05B 15/02* (2013.01)
USPC ........................................................ 700/286

(58) Field of Classification Search
CPC .................................. G05B 15/00; G05B 15/02
USPC ............. 700/22, 286, 297; 702/119, 122, 188
See application file for complete search history.

(56) References Cited

U.S. PATENT DOCUMENTS

| | | | |
|---|---|---|---|
| 8,718,829 B2 | 5/2014 | Coyne et al. | |
| 2009/0070051 A1 | 3/2009 | Vetter et al. | |
| 2009/0281674 A1 | 11/2009 | Taft | |
| 2010/0020724 A1 | 1/2010 | Wimmer et al. | |
| 2012/0253540 A1 | 10/2012 | Coyne et al. | |

FOREIGN PATENT DOCUMENTS

| WO | WO 2010063816 | 6/2010 |
|---|---|---|
| WO | WO 2010077830 | 7/2010 |

OTHER PUBLICATIONS

Gupta et al., Remote Terminal Units for Distribution Automation: Development and Commissioning Experience, International Journal of Computers and Applications, vol. 30, No. 2, 2008, pp. 80-91.

(Continued)

*Primary Examiner* — Sean Shechtman
*Assistant Examiner* — Chad Rapp
(74) *Attorney, Agent, or Firm* — Schmeiser, Olsen & Watts; John Pivnichny

(57) ABSTRACT

A commissioning method and system. The method includes receiving details of a configuring process enabled by a power grid monitoring/control device associated with a power grid network topology comprising monitoring points associated and a power distribution grid. The power grid network topology is validated with respect to a configuration of measurement types, event types, and controls of the power distribution grid. Network point identifiers for each of the monitoring points are retrieved and a mapping report associating the power grid monitoring/control device with the power grid network topology using the network point identifiers is generated. The power grid monitoring/control device is registered for remote operation functionality and multiple grid events. The power grid monitoring/control device is commissioned into the power distribution grid.

20 Claims, 7 Drawing Sheets

(56) References Cited

OTHER PUBLICATIONS

Technical Report, IEC TR 61850-1, First Edition Apr. 2003, Communication networks and systems in substations, Part 1: Introduction and overview, 37 pages.

International Standard, IEC 61850-3, First Edition Jan. 2002, Communication networks and systems in substations, Part 3: General requirements, 33 pages.

International Standard, IEC 61850-4, First Edition Jan. 2002, Communication networks and systems in substations, Part 4: System and project management, 59 pages.

International Standard, IEC 61850-5, First Edition, Jul. 2003, Communication networks and systems in substations, Part 5: Communication requirements for functions and device models, 131 pages.

International Standard, IEC 61850-6, First Edition Mar. 2004, Communication networks and systems in substations, Part 6: Configuration description language for communication in electrical substations related to IEDs, 144 pages.

International Standard, IEC 61850-7-1, First Edition Jul. 2003, Communication networks and systems in substations, Part 7-1: Basic communication structure for substation and feeder equipment—Principles and models, 110 pages.

International Standard, IEC 61850-7-2, First Edition May 2003, Communication networks and systems in substations, Part 7-2: Basic communication structure for substation and feeder equipment—Abstract communication service interface (ACSI), 171 pages.

International Standard, IEC 61850-7-3, First Edition May 2003, Communication networks and systems in substations, Part 7-3: Basic communication structure for substation and feeder equipment—Common data classes, 64 pages.

International Standard, IEC 61850-7-4, First Edition May 2003, Communication networks and systems in substations, Part 7-4: Basic communication structure for substation and feeder equipment—Compatible logical node classes and data classes, 104 pages.

International Standard, IEC 61850-8-1, First Edition May 2004, Communication networks and systems in substations, Part 8-1: Specific Communication Service Mapping (SCSM)—Mappings to MMS (ISO 9506-1 and ISO 9506-2) and to ISO/IEC 8802-3, 133 pages.

International Standard, IEC 61850-9-1, First Edition May 2003, Communication networks and systems in substations, Part 9-1: Specific Communication Service Mapping (SCSM)—Sampled values over serial unidirectional multidrop point to point link, 29 pages.

International Standard, IEC 61850-9-2, First Edition Apr. 2004, Communication networks and systems in substations, Part 9-2: Specific Communication Service Mapping (SCSM)—Sampled values over ISO/IEC 8802-3, 28 pages.

Notice of Allowance (Mail Date Dec. 19, 2013) for U.S. Appl. No. 13/078,089, filed Apr. 1, 2011.

IED Commissioning

IED Configuration

Physical Name: D015623   IP Address: 100.224.125.125
Device Gateway IP Address: 10.224.125.12   Device Gateway Port: 9020

IED Commissioning Status

| Sensor ID | Sensor Type | Sensor Units | Measurement Type List |
|---|---|---|---|
| OP1 | Optical Input (3 Phase) | Phase Currents (AC) | Amps (RMS 2sec), Amps (RMS 10 min), P, Q HARM3, HARM5, THD |
| VT1 | Voltage Transformer (3 Phase + Neutral) | Phase to Ground Volts (AC) | Volts (RMS 2sec), Volts (RMS 10 min), P, HARM3, HARM5, THD,VUF_Avg, VUF_Max,Sag_Count,Sag_Max, Swell_Count,Swell_Max |
| CT1 | Current Transformer (3 Phase) | Phase Currents (AC) | Amps (RMS 2sec), Amps (RMS 10 min), P, Q HARM3, HARM5, THD |
| CT2 | Current Transformer (3 Phase) | Phase Currents (AC) | Amps (RMS 2sec), Amps (RMS 10 min), P, Q HARM3, HARM5, THD |
| CT3 | Current Transformer (3 Phase) | Phase Currents (AC) | Amps (RMS 2sec), Amps (RMS 10 min), P, Q HARM3, HARM5, THD |
| CT4 | Current Transformer (3 Phase) | Phase Currents (AC) | Amps (RMS 2sec), Amps (RMS 10 min), P, Q HARM3, HARM5, THD |
| AN1 | Analogue Input | Temperature (Deg C) | TTM |
| AN2 | Analogue Input | Temperature (Deg C) | AMB |
| RO1 | Relay Control | Relay Open | Status |
| RO2 | Relay Control | Relay Close | Status |
| RO3 | Relay Control | Relay Open | Status |
| RO4 | Relay Control | Relay Close | Status |
| DI1 | Digital Input | Switch Opened | Status |
| DI2 | Digital Input | Switch Closed | Status |
| DI3 | Digital Input | Switch Earthed | Status |
| DI4 | Digital Input | Switch Opened | Status |
| DI5 | Digital Input | Switch Closed | Status |
| DI6 | Digital Input | Switch Earthed | Status |

Start

FIG. 3A

| | | | | |
|---|---|---|---|---|
| MAC Address: | D0-1F-E2-1A-DE-14 | IMEI: 54134021713105 | | IMSI: S0G06013400119306 |
| NTP IP Address: | 100.224.100.188 | | | 314a |

| Event Type List | Parameters | Monitored Equipment Type | Monitored Equipment Name | Commissioning Status |
|---|---|---|---|---|
| EFI, LFI, Open Phase | EFI_Threshold, LFI_Threshold, | Switch | H512345:11kV:A | OK |
| High_Volts, Low_Volts, No_Volts, | High_Volt_Threshold, Low_Volt_Threshold, No_Volt_Threshold, | Transformer Winding | H512345:415V:TX1 | OK |
| Blown_Fuse Over_Current | Fuse_Rating | Fuse | H512345:415V:TX1 | OK |
| Blown_Fuse Over_Current | Fuse_Rating | Fuse | H512345:415V:2 | OK |
| Blown_Fuse Over_Current | Fuse_Rating | Fuse | H512345:415V:3 | OK |
| Blown_Fuse Over_Current | Fuse_Rating | Fuse | H512345:415V:4 | OK |
| AN1 | High_Temp_Threshold | Transformer | H512345:11kV:TX1 | OK |
| AN2 | High_Temp_Threshold | Substation | H512345: | OK |
| RO1 | Pulse Duration | Switch | H512345:11kV:A | OK |
| RO2 | Pulse Duration | Switch | H512345:11kV:A | OK |
| RO3 | Pulse Duration | Switch | H512345:11kV:B | OK |
| RO4 | Pulse Duration | Switch | H512345:11kV:B | OK |
| D11 | Transition Type | Switch | H512345:11kV:A | OK |
| D12 | Transition Type | Switch | H512345:11kV:A | OK |
| D13 | Transition Type | Switch | H512345:11kV:A | OK |
| D14 | Transition Type | Switch | H512345:11kV:B | OK |
| D15 | Transition Type | Switch | H512345:11kV:B | OK |
| D16 | Transition Type | Switch | H512345:11kV:B | OK |

FIG. 3B

IED Commissioning 305b

IED Configuration

Physical Name: D015623    IP Address: 100.224.125.125

Device Gateway IP Address: 10.224.125.12    Device Gateway Port: 9020

308a

IED Commissioning Status

| Sensor ID | Sensor Type | Sensor Units | Measurement Type List |
|---|---|---|---|
| OP1 | Optical Input (3 Phase) | Phase Currents (AC) | Amps (RMS 2sec), Amps (RMS 10 min), P, Q HARM3, HARM5, THD |
| VT1 | Voltage Transformer (3 Phase + Neutral) | Phase to Ground Volts (AC) | Volts (RMS 2sec), Volts (RMS 10 min), P, HARM3, HARM5, THD,VUF_Avg, VUF_Max,Sag_Count,Sag_Max, Swell_Count,Swell_Max |
| CT1 | Current Transformer (3 Phase) | Phase Currents (AC) | Amps (RMS 2sec), Amps (RMS 10 min), P, Q HARM3, HARM5, THD |
| CT2 | Current Transformer (3 Phase) | Phase Currents (AC) | Amps (RMS 2sec), Amps (RMS 10 min), P, Q HARM3, HARM5, THD |
| CT3 | Current Transformer (3 Phase) | Phase Currents (AC) | Amps (RMS 2sec), Amps (RMS 10 min), P, Q HARM3, HARM5, THD |
| CT4 | Current Transformer (3 Phase) | Phase Currents (AC) | Amps (RMS 2sec), Amps (RMS 10 min), P, Q HARM3, HARM5, THD |
| AN1 | Analogue Input | Temperature (Deg C) | TTM |
| AN2 | Analogue Input | Temperature (Deg C) | AMB |
| RO1 | Relay Control | Relay Open | Status |
| RO2 | Relay Control | Relay Close | Status |
| RO3 | Relay Control | Relay Open | Status |
| RO4 | Relay Control | Relay Close | Status |
| DI1 | Digital Input | Switch Opened | Status |
| DI2 | Digital Input | Switch Closed | Status |
| DI3 | Digital Input | Switch Earthed | Status |
| DI4 | Digital Input | Switch Opened | Status |
| DI5 | Digital Input | Switch Closed | Status |
| DI6 | Digital Input | Switch Earthed | Status |

Start

FIG. 3C

ENERGY GRID DEVICE COMMISSIONING

This application is a continuation application claiming priority to Ser. No. 13/078,089 filed Apr. 1, 2011.

FIELD

The present invention relates to a method and associated system for commissioning a smart power grid monitoring/control device into a power grid of an electricity utility company and provisioning the smart power grid monitoring/control device into a back-end enterprise system.

BACKGROUND

Monitoring power systems typically comprises an inaccurate process with little flexibility. Accordingly, there exists a need in the art to overcome at least some of the deficiencies and limitations described herein above.

SUMMARY

The present invention provides a commissioning method comprising: receiving, by a computer processor of a computing apparatus, a first message indicating details of a configuring process enabled by a power grid monitoring/control device, wherein the power grid monitoring/control device is associated with a power grid network topology comprising monitoring points associated with a power distribution grid; validating, by the computer processor in response to the receiving the first message, the power grid network topology with respect to configuration measurement types, event types, and controls performed by the of the power grid monitoring/control device with respect to the power distribution grid; retrieving, by the computer processor, network point identifiers for each of the monitoring points; generating, by the computer processor, a first mapping report associating the power grid monitoring/control device with the power grid network topology using the network point identifiers; registering, by the computer processor, the first mapping report; transforming, by the computer processor, the measurement types, the event types, and the controls to a specified industry standard; generating, by the computer processor, a results message indicating a success or failure of the transforming; generating, by the computer processor, measurement points associated with the network point identifiers; associating, by the computer processor, measurement types associated with the network point identifiers; first registering, by the computer processor, the power grid monitoring/control device for remote operation functionality; second registering, by the computer processor, the power grid monitoring/control device with multiple grid events associated with various malfunctions within the power distribution grid; confirming, by the computer processor, the configuring, the validating, the registering, the associating, the first registering, and the second registering; and commissioning, by the computer processor based on the confirming, the power grid monitoring/control device into the power distribution grid.

The present invention provides a computing system comprising a computer processor coupled to a computer-readable memory unit, the memory unit comprising instructions that when executed by the computer processor implements a method comprising: receiving, by the computer processor, a first message indicating details of a configuring process enabled by a power grid monitoring/control device, wherein the power grid monitoring/control device is associated with a power grid network topology comprising monitoring points associated with a power distribution grid; validating, by the computer processor in response to the receiving the first message, the power grid network topology with respect to configuration measurement types, event types, and controls performed by the of the power grid monitoring/control device with respect to the power distribution grid; retrieving, by the computer processor, network point identifiers for each of the monitoring points; generating, by the computer processor, a first mapping report associating the power grid monitoring/control device with the power grid network topology using the network point identifiers; registering, by the computer processor, the first mapping report; transforming, by the computer processor, the measurement types, the event types, and the controls to a specified industry standard; generating, by the computer processor, a results message indicating a success or failure of the transforming; generating, by the computer processor, measurement points associated with the network point identifiers; associating, by the computer processor, measurement types associated with the network point identifiers; first registering, by the computer processor, the power grid monitoring/control device for remote operation functionality; second registering, by the computer processor, the power grid monitoring/control device with multiple grid events associated with various malfunctions within the power distribution grid; confirming, by the computer processor, the configuring, the validating, the registering, the associating, the first registering, and the second registering; and commissioning, by the computer processor based on the confirming, the power grid monitoring/control device into the power distribution grid.

The present invention provides a computer program product, comprising a computer readable storage medium having a computer readable program code embodied therein, the computer readable program code comprising an algorithm that when executed by a computer processor of a computing apparatus implements a method comprising: receiving, by the computer processor, a first message indicating details of a configuring process enabled by a power grid monitoring/control device, wherein the power grid monitoring/control device is associated with a power grid network topology comprising monitoring points associated with a power distribution grid; validating, by the computer processor in response to the receiving the first message, the power grid network topology with respect to configuration measurement types, event types, and controls performed by the of the power grid monitoring/control device with respect to the power distribution grid; retrieving, by the computer processor, network point identifiers for each of the monitoring points; generating, by the computer processor, a first mapping report associating the power grid monitoring/control device with the power grid network topology using the network point identifiers; registering, by the computer processor, the first mapping report; transforming, by the computer processor, the measurement types, the event types, and the controls to a specified industry standard; generating, by the computer processor, a results message indicating a success or failure of the transforming; generating, by the computer processor, measurement points associated with the network point identifiers; associating, by the computer processor, measurement types associated with the network point identifiers; first registering, by the computer processor, the power grid monitoring/control device for remote operation functionality; second registering, by the computer processor, the power grid monitoring/control device with multiple grid events associated with various malfunctions within the power distribution grid; confirming, by the computer processor, the configuring, the validating, the registering, the associating, the first registering, and the second registering; and commissioning, by the computer processor based on the confirming, the power grid monitoring/control device into the power distribution grid.

The present invention advantageously provides a simple method and associated system capable of monitoring power systems.

BRIEF DESCRIPTION OF THE DRAWINGS

FIGS. 3A-3D illustrate computer screen shots illustrating results of a process for commissioning a smart device into service with respect to a power distribution grid, in accordance with embodiments of the present invention.

DETAILED DESCRIPTION

Figure 1:
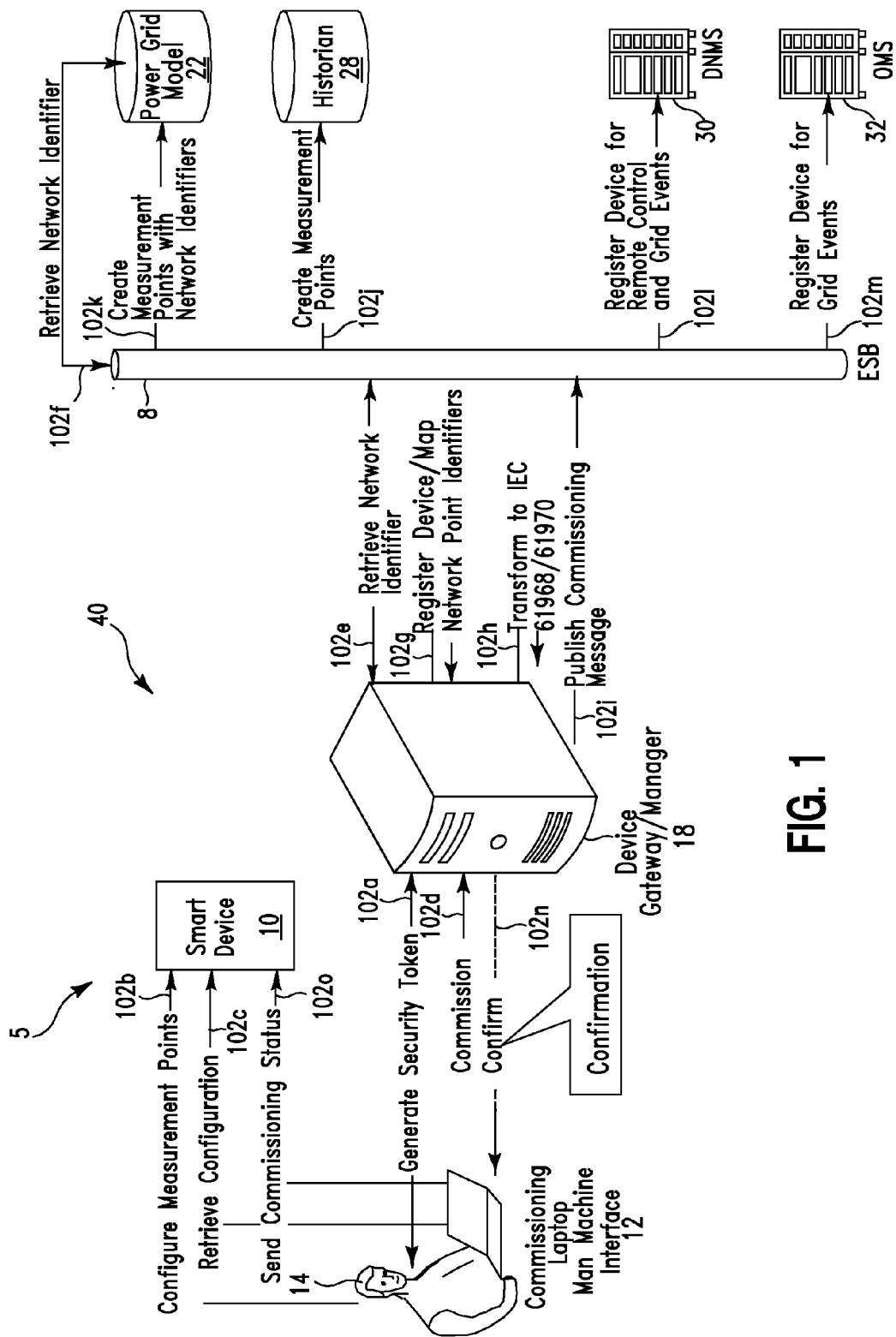
FIG. 1 illustrates a system for commissioning a smart device into service with respect to a power distribution grid, in accordance with embodiments of the present invention.

FIG. 1 illustrates a system 5 for commissioning a device 10 into service with respect to a power distribution grid 40, in accordance with embodiments of the present invention. Power distribution grid 40 distributes power to a plurality of locations (e.g., homes, businesses, etc) for usage by electrical devices (e.g., appliances, etc). Power distribution grid 40 (or smart grid) comprises (smart) devices (e.g., device 10) for instrumentation in order to monitor, control, and manage power distribution grid 40. Device 10 may comprise any type of instrumentation device or type including, inter alia, a sensor(s), measurement types, event types, control types, etc. System 5 enables a process (i.e., comprising a plurality of steps performed over communication links 102a . . . 102n as described in detail with respect the algorithm of FIG. 2) for automatically provisioning (smart) devices (e.g., device 10) into various locations within power distribution grid 40 and backend systems. For example, system 5 enables a process for:

1. Verifying that a configuration of device 10 is not violating a grid topology registered with a geographic information system (GIS).
2. Registering device 10 for managing the device.
3. Notifying additional systems (e.g., distribution network management system (DNMS) 30 and outage management system (OMS) 32 of a configuration of a plurality of power grid monitoring/control devices with the power grid network topology using network point identifiers. If any of the provisioning steps fail, the commissioning process may be rolled back and a field engineer may be notified in order to take corrective actions. By registering device 10, these are managed effectively (e.g., installing new firmware, changing settings, etc).

System 5 comprises a computing device 12 (e.g., a computer), device 10 connected to power distribution grid 40, a device gateway/manager 18, an enterprise service bus (ESB) 8, a power grid model database 22, a historian database 28, DNMS 30, and an OMS 32. Computing device 12 is used by a user 14 to enter configuration data associated with monitoring points in power grid 40 and commands into device 10. Device gateway 18 enables all functionality associated with commissioning device 10 into service with respect to power distribution grid 40 and orchestrate the commissioning process. Enterprise service bus (ESB) 8 comprises a software architecture construct that provides fundamental services for complex architectures via an event driven and standards based messaging engine. ESB 8 is a universal integration backbone of an enterprise IT System. ESB 8 acts as a shared messaging layer for connecting applications and other services throughout an enterprise computing infrastructure. OMS 32 comprises a back-end IT subsystem used by, inter alia, an electrical utility company to manage power faults and power outages in within an electrical network (e.g., power distribution grid 40). OMS 32 manages power outages by: identifying a fault type and fault location, determining a root cause of a fault, and taking an appropriate action for restoration of power. DNMS 30 comprises a back-end IT subsystem that used by an electrical utility company to manage a power distribution network. Network operators of the electrical utility company may (via DNMS 30) view/monitor a state of power distribution grid 40 and manage power distribution grid 40 with appropriate actions. Historian database 28 comprises a utility back-end IT subsystem that stores measurements and events (received from smart devices such as device 10) with respect to logical network point identifiers in historical way for analytics. System 5 comprises software (e.g., within computing device 12) for performing the following provisioning functional steps:

1. Smart devices (e.g., device 10) are configured by entering details associated with network points to be monitored or controlled. These network points may include, inter alia, switches, transformers, bays etc. For example, if an 11KV switch must be controlled on substation (SV001), a device must be configured with both a substation identifier and a switch identifier.
2. A commissioning engineer retrieves the configuration details from the smart device in the interface computer (e.g., device 12) and initiates the commissioning process.
3. The interface computer (e.g., device 12) may transmit a commissioning message (comprising a complete configuration of network points) to device gateway 18.
4. Device gateway 18 queries power grid model 22 (i.e., a master store of network points) to determine a validity of network points received as part of the commissioning message.
5. As network points are validated, device gateway 18 registers device 10. While registering the device, device gateway 18 stores a mapping report associating network points (from a grid topology) with the device (from the commissioning message).
6. Device gateway 18 transforms commissioning details (e.g., a substation/device configuration file) into IEC 61968/61970 aligned messages for publication to backend enterprise systems and provisions device 10 into the backend systems automatically notifying configuration of power grid monitoring/control devices with the power grid network topology using network point identifiers. For example, notification includes notifying:

A. Historian database 28 for creating place holders to store interval data. For example, measurement types and event types associated with network point identifiers enabling future measurement types and event types to be stored.
B. Power grid model 22 in order to mark a new point enabled for monitoring.
C. DNMS 30 for presenting monitored substations (i.e., for load and remote switch control capability).
D. OMS 32 for monitoring expect outage events from monitored points in the network.

7. Device gateway 18 notifies device 10 about successful completion of a commissioning process (e.g., through device 12 to a field engineer).
8. If any of the previous provisioning steps fail, the software application comprises an ability to roll back registering of device 10 in backend systems and notify the field engineer about an actual problem that occurred so that the field engineer may take corrective actions.

Figure 2:
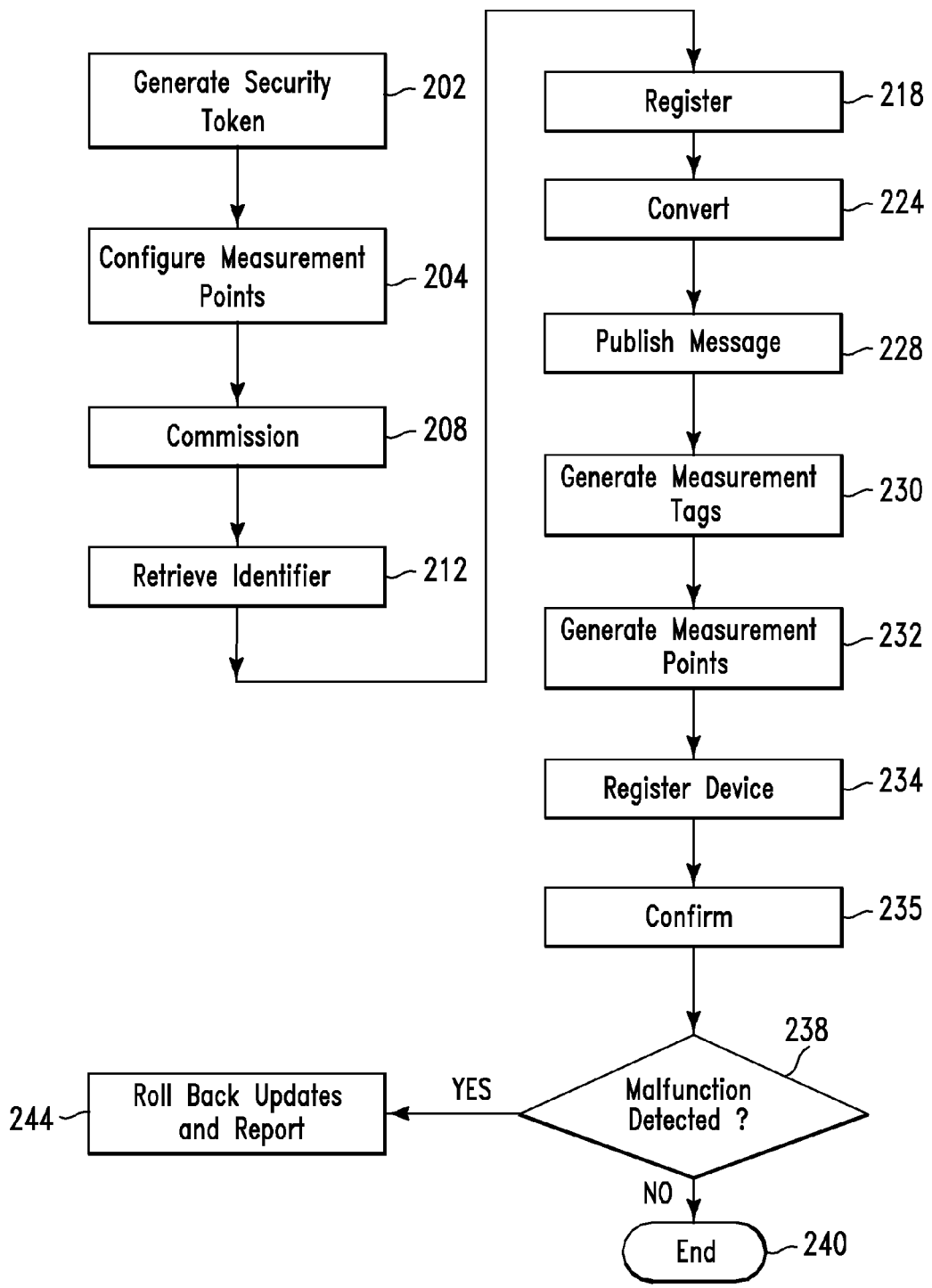
FIG. 2 illustrates a flowchart describing an algorithm used by the system of FIG. 1 for commissioning a smart device into service with respect to a power distribution grid, in accordance with embodiments of the present invention.

FIG. 2 illustrates a flowchart describing an algorithm used by system 5 of FIG. 1 for commissioning a smart device into service with respect to a power distribution grid, in accordance with embodiments of the present invention. In step 202(via communication link 102*a*), an optional security token is generated by obtaining a one-time key to validate an authenticity of a commissioning activity. The one-time key (i.e., valid for a short duration) is allocated by a device gateway (e.g., device gateway 18 in FIG. 1) associated with the smart device. An installation engineer may access the device gateway to generate the one-time key using a number of possible implementation options. The one-time key may be delivered verbally (via a mobile phone) or electronically (via a secured VPN over a mobile data network). A smart device unique identifier, name and password of an installation engineer, and a commissioning timestamp may be used to generate the one-time key. In step 204 (via communication link 102*b* of FIG. 1), a interface computer (e.g., commissioning laptop man machine interface 12 of FIG. 1) configures (in response to a command from an installation engineer) monitoring points associated with a power distribution grid (e.g., power distribution grid 40 of FIG. 1) in a (power grid monitoring/control) smart device (e.g., device 10 of FIG. 1) associated with a power grid network topology. For example, an installation engineer visits a location associated with a smart device installation and configuration. The engineer uses a configuration graphical user interface (GUI) to configure the following items: a smart device unique identifier (e.g., an internet protocol address, a media access control address, an international mobile equipment identity number of a smart device, an international mobile subscriber identity number of wireless modem attached to smart device, etc), a location identifier, measurement locations and types of measurements, controlled devices and nature of controls available, etc. An electrical network point location (i.e., that complies with power network grid locations) is configured with smart device sensors. As a result of the configuration the following outputs are generated: a confirmation of the success of the configuration activity, a validation of the smart device identifier against known legal values, and a validation of measurement types and control capabilities again known legal values. In step 208 (via communication links 102*c* and 102*d* of FIG. 1), a commissioning process is initiated. During the commissioning process an installation engineer uses a configuration GUI communicating with the smart device to retrieve the configuration details from device and initiate the commissioning process. In response, the GUI transmits (to a device gateway such as device gateway 18 of FIG. 1) a commissioning message (e.g., an xml commissioning message comprising all device configurations for the smart device, a device configuration that complies with industry standard IEC61850 SCL, etc) comprising all configuration details generated in step 202. In step 212 (via communication links 102*e* and 102*f* of FIG. 1), network point identifiers are retrieved for network monitoring points configured with device. After receiving the commissioning message, the device gateway inquires (the utility company backend enterprise IT system that manages the electricity grid topology through enterprise service bus (ESB) such as ESB 8 of FIG. 1) about the validity of a network point location with respect to the configuration of measurements, events and controls. Any programmatic system interaction between the device gateway and the utility company backend enterprise system through the ESB ensure that the configuration (i.e., for the smart device) is not violating a grid topology registered with in the backend enterprise system. For each network point monitored by the smart device (if the configuration is valid), a power grid model (e.g., power grid model 22 of FIG. 1) returns logical network point identifiers that identify network points in all the different application subsystems in the utility company backend enterprise IT system. In step 218 (via communication link 102*g* of FIG. 1), mapping of smart device with network point identifier is registered. Smart devices installed in a smart electrical network are required to be managed after an initial configuration and installation. Managing the smart devices may include the capabilities of: upgrading/downgrading firmware/software versions of smart devices and setting different monitoring parameters of measurements and events. Therefore (during the commissioning process), a device gateway (e.g., device gateway 18 of FIG. 1) generates and maintains a map of smart device identifiers to the network topology or logical network point identifiers. This map is also useful in reporting the measurements and alarms (generated by the smart device) against the logical network point identifiers by device gateway. In step 224 (via communication link 102*h* of FIG. 1), details (e.g., logical network point identifiers and associated electrical and nonelectrical measurements, events and controls monitored by the smart device at each network point are converted (i.e., by the device gateway) to an electrical industry standard IEC 61970 so that utility backend enterprise IT subsystems may comprehend information and register the details. In step 228 (via communication link 102*i* of FIG. 1), the device gateway publishes a message (associated with the IEC 61970 compliant smart device commissioning and provisioning event) to the ESB. In response, the ESB transmits the message to associated backend enterprise IT subsystems to provision the smart device and monitored electrical/non-electrical measurements, events, and controls the device monitors at each network point with respect to logical network point identifiers. In step 230 (via communication link 102*j* of FIG. 1), measurement points with grid connectivity identifiers are generated. The measurement points are associated with measurement types and event types with respect to logical network point identifiers so that the future measurements and events from smart devices may be stored and retrieved. In step 232 (via communication link 102*k* of FIG. 1), measurement points with grid connectivity identifiers are generated because a power network model is required to provision various measurement types and event types during a smart device commissioning process. This process enables the power network model IT subsystem to provide a grid topology at a given time with information associated with various network points being monitored by the smart devices. In step 234 (via communication links 102*l* and 102*m* of FIG. 1), the smart device is registered for remote operation and specified grid events. In step 235 (via communication link 102*n* of FIG. 1), a confirmation/outcome (with respect to errors) process is executed. The confirmation/outcome process is executed with respect to:

1. A validation of network point and device configuration details.
2. A registration of the smart device for device management.
3. A provision of various electrical and non electrical measurement types.

4. A provision of various events types.
5. A provision of remote control of equipment in backend IT subsystems to an installation engineer through a GUI connected to the smart device. This process provides feedback about an actual problem so corrective action may be executed.

In step 238, it is determined if a malfunction is detected (i.e., if any of the aforementioned step fail) based on results of step 235. If in step 238, it is determined that a malfunction is not detected then the process is terminated in step 240. If in step 238, it is determined that a malfunction is detected then in step 244, any updates enabled with respect to backend IT subsystems are rolled back. Additionally, feedback associated with a detected malfunction is provided.

FIGS. 3A-3D illustrate computer screen shots illustrating results of a process for commissioning a smart device into service with respect to a power distribution grid, in accordance with embodiments of the present invention.

FIGS. 3A and 3B illustrate a computer screen shot 305a illustrating a confirmation and positive feedback result associated with a smart device commissioning process. Computer screen shot 305a illustrates types of sensors in smart devices 308a associated with controls and active statuses 314a.

Figure 3D:
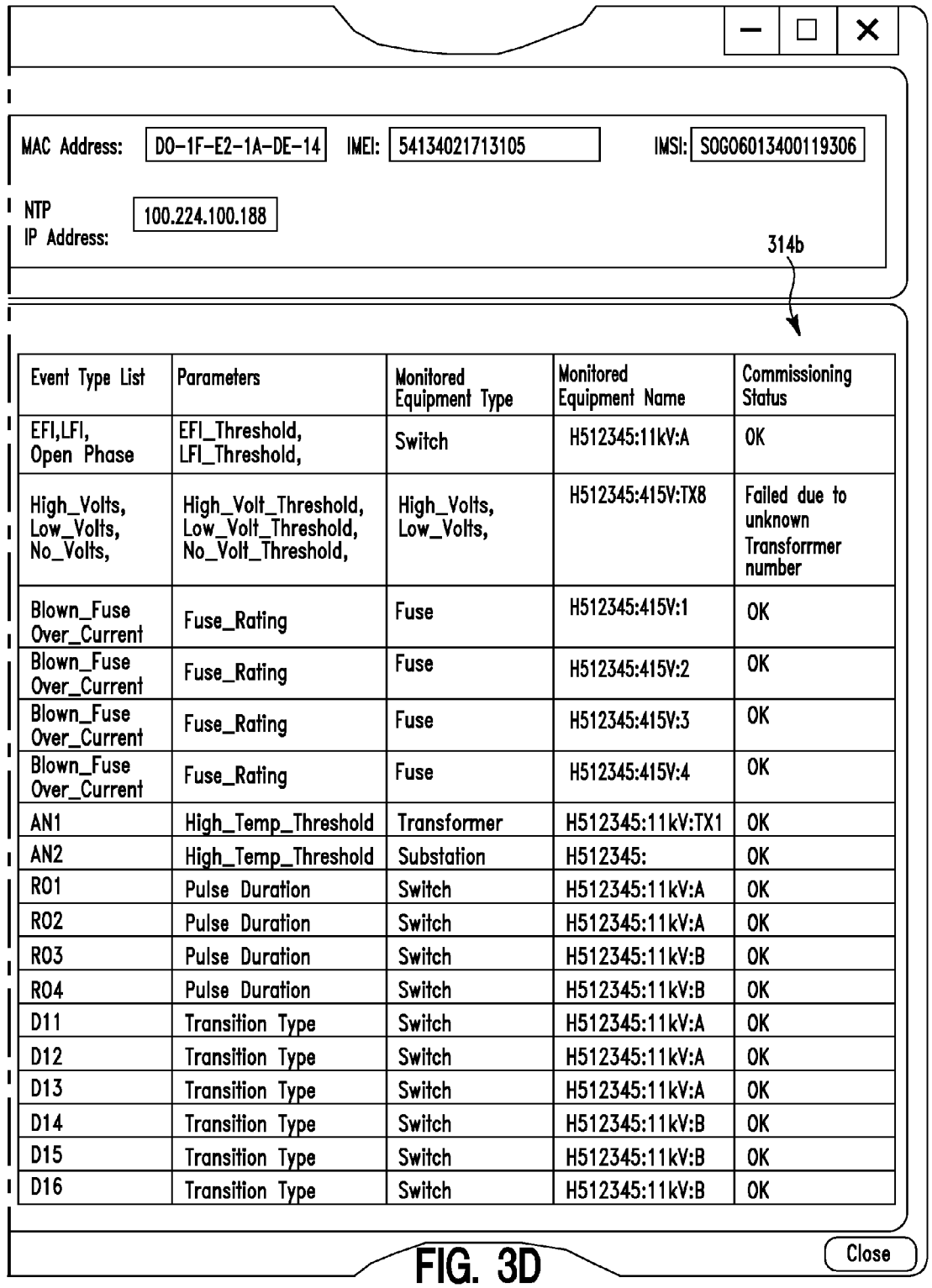

FIGS. 3C and 3D illustrate a computer screen shot 305b illustrating a negative feedback result associated with a smart device commissioning process. Computer screen shot 305b illustrates types of sensors in smart devices 308a associated with controls and active and defect statuses 314b.

Figure 4:
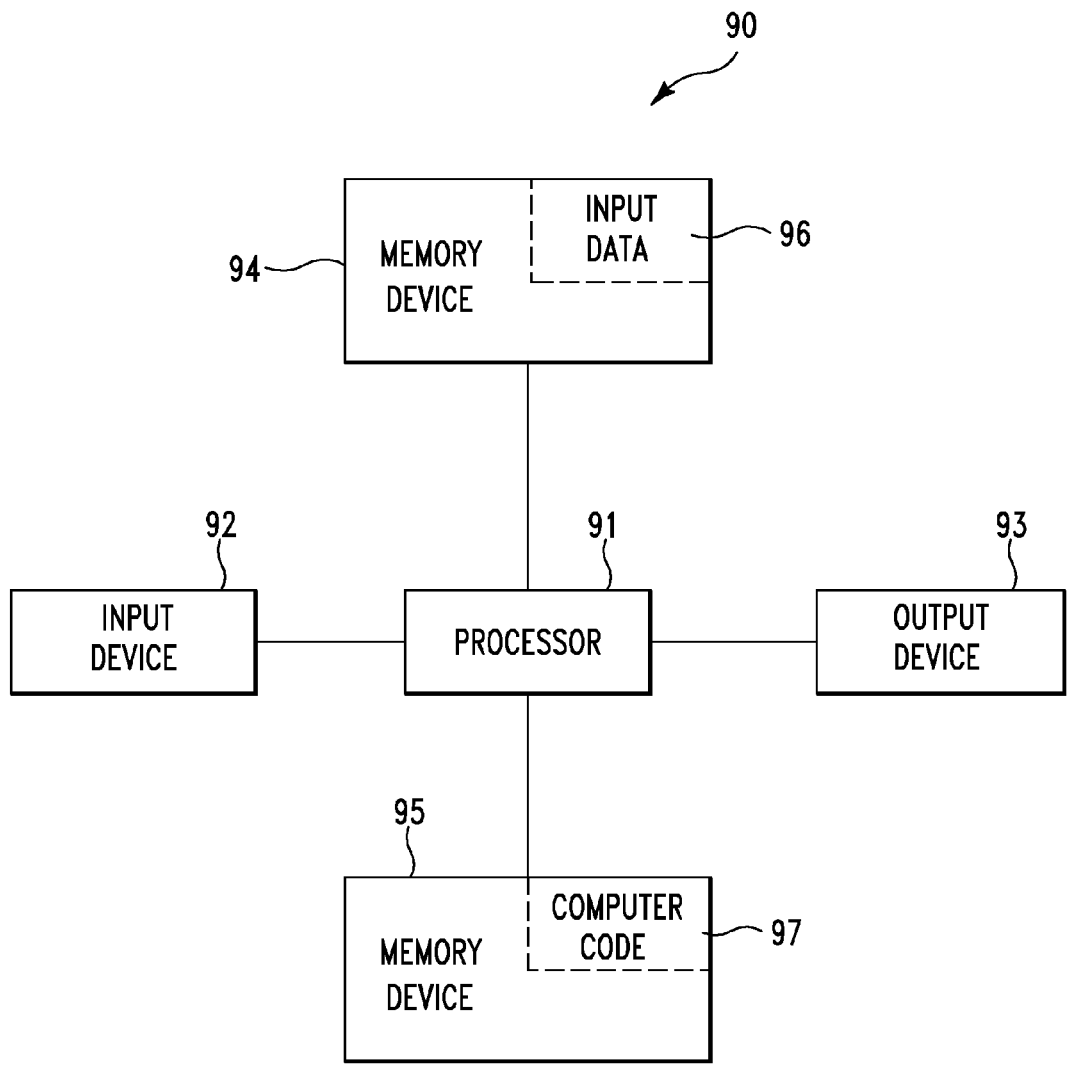
FIG. 4 illustrates a computer apparatus used for commissioning a smart device into service with respect to a power distribution grid, in accordance with embodiments of the present invention.

FIG. 4 illustrates a computer apparatus 90 (e.g., device gateway 18 and/or commissioning laptop 12 of FIG. 1) used for commissioning a smart device into service with respect to a power distribution grid, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for commissioning a smart device into service with respect to a power distribution grid. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to commission a smart device into service with respect to a power distribution grid. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for commissioning a smart device into service with respect to a power distribution grid. In another embodiment, the invention provides a business method that performs the process steps of the invention on a subscription, advertising, and/or fee basis. That is, a service supplier, such as a Solution Integrator, could offer to commission a smart device into service with respect to a power distribution grid. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A commissioning method comprising:
receiving, by a computer processor of a computing apparatus, a first message indicating details of a configuring process enabled by a power grid monitoring/control device, wherein said power grid monitoring/control device is associated with a power grid network topology comprising monitoring points associated with a power distribution grid;
validating, by said computer processor in response to said receiving said first message, said power grid network topology with respect to configuration measurement types, event types, and controls performed by said power grid monitoring/control device with respect to said power distribution grid;
generating, by said computer processor, a first mapping report associating said power grid monitoring/control device with said power grid network topology using network point identifiers for each of said monitoring points;
registering, by said computer processor, said first mapping report;
transforming, by said computer processor, said measurement types, said event types, and said controls to a specified industry standard;
generating, by said computer processor, a results message indicating a success or failure of said transforming;
generating, by said computer processor, measurement points associated with said network point identifiers;
associating, by said computer processor, measurement types associated with said network point identifiers;

first registering, by said computer processor, said power grid monitoring/control device with multiple grid events associated with various malfunctions within said power distribution grid;

confirming, by said computer processor, said configuring, said validating, said registering, said associating, and said first registering; and commissioning, by said computer processor based on said confirming, said power grid monitoring/control device into said power distribution grid.

2. The method of claim 1, wherein said configuring process comprises configuring: an identifier for said power grid monitoring/control device, a location identifier for said power grid monitoring/control device, measurement locations associated with said power grid monitoring/control device, and a measurement type associated with said power grid monitoring/control device.

3. The method of claim 1, further comprising:
generating, by said computer processor a security token associated with a validation of authenticity of said commissioning method.

4. The method of claim 1, wherein said network point identifiers identify said monitoring points with respect to multiple application subsystems associated with a utility backend enterprise system.

5. The method of claim 1, wherein said first mapping report comprises a map of device identifiers for said power grid monitoring/control device and said power grid network topology.

6. The method of claim 1, wherein said specified industry standard comprises an IEC 61970.

7. The method of claim 1, further comprising:
transmitting, by said computer processor, said results message to backend enterprise systems to provision said power grid monitoring/control device and associated measurement types, event types, and controls monitored by said power grid monitoring/control device at each of said monitoring points with respect to said network point identifiers.

8. The method of claim 1, further comprising:
provisioning or notifying, by said computer processor to backend enterprise systems, a configuration of a plurality of power grid monitoring/control devices with said power grid network topology using said network point identifiers.

9. The method of claim 1, further comprising:
detecting, by said computer processor, a malfunction associated with said receiving, said validating, said retrieving, said generating said first mapping report, said instructing, said transforming, said generating said results message, said generating said measurement points, said associating, said first registering, said second registering, said confirming, or said commissioning;
rolling back, by said computer processor based on said malfunction, updates associated with backend enterprise systems; and
transmitting, by said computer processor to a graphical user interface of an interface computer, details associated with said malfunction.

10. The method of claim 1, further comprising:
providing a process for supporting computer infrastructure, said process comprising providing at least one support service for at least one of creating, integrating, hosting, maintaining, and deploying computer-readable code in a computing system, wherein the code in combination with the computing system is capable of performing: said receiving, said validating, said generating said first mapping report, said instructing, said registering, said generating said results message, said generating said measurement points, said associating, said first registering, said confirming, and said commissioning.

11. A computing system comprising a computer processor coupled to a computer-readable memory unit, said memory unit comprising instructions that when executed by the computer processor implements a method comprising:
receiving, by said computer processor, a first message indicating details of a configuring process enabled by a power grid monitoring/control device, wherein said power grid monitoring/control device is associated with a power grid network topology comprising monitoring points associated with a power distribution grid;
validating, by said computer processor in response to said receiving said first message, said power grid network topology with respect to configuration measurement types, event types, and controls performed by said power grid monitoring/control device with respect to said power distribution grid;
generating, by said computer processor, a first mapping report associating said power grid monitoring/control device with said power grid network topology using network point identifiers for each of said monitoring points;
registering, by said computer processor, said first mapping report;
transforming, by said computer processor, said measurement types, said event types, and said controls to a specified industry standard;
generating, by said computer processor, a results message indicating a success or failure of said transforming;
generating, by said computer processor, measurement points associated with said network point identifiers;
associating, by said computer processor, measurement types associated with said network point identifiers;
first registering, by said computer processor, said power grid monitoring/control device with multiple grid events associated with various malfunctions within said power distribution grid;
confirming, by said computer processor, said configuring, said validating, said registering, said associating, and said first registering; and
commissioning, by said computer processor based on said confirming, said power grid monitoring/control device into said power distribution grid.

12. The computing system of claim 11, wherein said configuring process comprises configuring: an identifier for said power grid monitoring/control device, a location identifier for said power grid monitoring/control device, measurement locations associated with said power grid monitoring/control device, and a measurement type associated with said power grid monitoring/control device.

13. The computing system of claim 11, wherein said method further comprises:
generating, by said computer processor a security token associated with a validation of authenticity of said commissioning method.

14. The computing system of claim 11, wherein said network point identifiers identify said monitoring points with respect to multiple application subsystems associated with a utility backend enterprise system.

15. The computing system of claim 11, wherein said first mapping report comprises a map of device identifiers for said power grid monitoring/control device and said power grid network topology.

16. The computing system of claim 11, wherein said specified industry standard comprises an IEC 61970.

17. The computing system of claim 11, wherein said method further comprises:

transmitting, by said computer processor, said results message to backend enterprise systems to provision said power grid monitoring/control device and associated measurement types, event types, and controls monitored by said power grid monitoring/control device at each of said monitoring points with respect to said network point identifiers.

18. The computing system of claim 11, wherein said method further comprises:

provisioning or notifying, by said computer processor to backend enterprise systems, a configuration of a plurality of power grid monitoring/control devices with said power grid network topology using said network point identifiers.

19. The computing system of claim 11, wherein said method further comprises:

detecting, by said computer processor, a malfunction associated with said receiving, said validating, said retrieving, said generating said first mapping report, said instructing, said transforming, said generating said results message, said generating said measurement points, said associating, said first registering, said second registering, said confirming, or said commissioning;

rolling back, by said computer processor based on said malfunction, updates associated with backend enterprise systems; and transmitting, by said computer processor to a graphical user interface of an interface computer, details associated with said malfunction.

20. A computer program product, comprising a computer readable hardware storage device storing a computer readable program code, said computer readable program code comprising an algorithm that when executed by a computer processor of a computing apparatus implements a method comprising:

receiving, by said computer processor, a first message indicating details of a configuring process enabled by a power grid monitoring/control device, wherein said power grid monitoring/control device is associated with a power grid network topology comprising monitoring points associated with a power distribution grid;

validating, by said computer processor in response to said receiving said first message, said power grid network topology with respect to configuration measurement types, event types, and controls performed by said power grid monitoring/control device with respect to said power distribution grid;

generating, by said computer processor, a first mapping report associating said power grid monitoring/control device with said power grid network topology using network point identifiers for each of said monitoring points;

registering, by said computer processor, said first mapping report;

transforming, by said computer processor, said measurement types, said event types, and said controls to a specified industry standard;

generating, by said computer processor, a results message indicating a success or failure of said transforming;

generating, by said computer processor, measurement points associated with said network point identifiers;

associating, by said computer processor, measurement types associated with said network point identifiers;

first registering, by said computer processor, said power grid monitoring/control device with multiple grid events associated with various malfunctions within said power distribution grid;

confirming, by said computer processor, said configuring, said validating, said registering, said associating, and said first registering; and commissioning, by said computer processor based on said confirming, said power grid monitoring/control device into said power distribution grid.

\* \* \* \* \*